United States Patent [19]

Rigge et al.

[11] 4,216,130
[45] Aug. 5, 1980

[54] BAUXITE AS FLAME-RETARDANT FILLER FOR POLYMER COMPOSITIONS

[75] Inventors: Ronald J. Rigge, Pleasanton, Calif.; Burton J. Beadle, Baton Rouge, La.; William A. Belding, Pleasanton, Calif.

[73] Assignee: Kaiser Aluminum & Chemical Corporation, Oakland, Calif.

[21] Appl. No.: 959,957

[22] Filed: Nov. 13, 1978

Related U.S. Application Data

[63] Continuation of Ser. No. 870,794, Jan. 19, 1978, abandoned.

[51] Int. Cl.$^2$ .............................................. C08J 9/30
[52] U.S. Cl. .................... 260/29.7 R; 260/45.7 R; 260/723; 260/739; 260/746; 260/DIG. 24; 428/95; 521/71; 521/92; 521/123; 521/907
[58] Field of Search .................... 521/907, 71, 92; 260/42.43, 42.37, DIG. 24, 45.7 R, 746, 739, 29.7 R

[56] References Cited

U.S. PATENT DOCUMENTS

| | | | |
|---|---|---|---|
| 2,168,949 | 8/1939 | Bentz et al. | 260/746 |
| 2,303,120 | 11/1942 | Greaves-Walker | 260/746 |
| 2,335,104 | 11/1943 | Britt et al. | 260/746 |
| 3,639,298 | 2/1972 | Lister et al. | 260/2.5 L |
| 3,699,041 | 10/1972 | Sanderford et al. | 260/2.5 L |
| 3,740,357 | 6/1973 | Wax | 260/2.5 H |
| 3,874,889 | 4/1975 | Geppert et al. | 260/2.5 FP |

OTHER PUBLICATIONS

"Kirk-Othmer", Encyc. of Chem. Technology, vol. 1, 2nd Ed., 1963, Wiley & Sons, pp. 931-933.

*Primary Examiner*—Morton Foelak
*Attorney, Agent, or Firm*—Paul E. Calrow; Andrew E. Barlay

[57] ABSTRACT

Bauxites are rendered compatible with polymer compositions employed in the carpet industry. Suitable bauxites, which can be employed as flame-retarding fillers, are characterized by a surface area of less than about 12 m$^2$/g, a pH in aqueous suspension of more than about 6.5 and a particle size distribution, wherein less than about 15% by weight of the particles have a size of less than 3 microns. Bauxites having a surface area in the range of about 12–20 m$^2$/g can also be rendered compatible by modifying their surfaces with a small but effective amount of modifier selected from inorganic phosphates, silicates, aliphatic and aromatic hydroxycarboxylic acids.

9 Claims, No Drawings

BAUXITE AS FLAME-RETARDANT FILLER FOR POLYMER COMPOSITIONS

CROSS-REFERENCE TO RELATED APPLICATIONS

This application is a continuation of copending application Ser. No. 870,794, filed Jan. 19, 1978, now abandoned.

BACKGROUND OF THE INVENTION

During the past few years, extensive efforts have been made to provide flame-retarded carpets for both residential and commercial buildings. One of the best flame retardants for this purpose was found to be alumina hydrate ($Al_2O_3 \cdot 3H_2O$), also referred to as "hydrated alumina". This material not only provides excellent flame-retarding properties, but is also nontoxic and readily utilizable in the carpet industry. The alumina hydrates employed as flame-retarding agents for carpets generally result from the extensive refining of bauxite and are characterized by high purity and substantially uniform physical and chemical characteristics. Since alumina hydrate, as mentioned before, results from the purification of bauxite and its manufacture involves a large number of processing steps, it is not an inexpensive material and sometimes, due to its wide application in other areas, is not always readily available. Consequently, there has been a continuing need for a flame-retarding agent which is available in nearly unlimited quantity, does not exhibit toxic properties and, last but not least, does not have to undergo extensive refining before use in the carpet industry.

Logically, bauxite, the native ore of alumina hydrate, would be such a suitable flame-retarding agent. However, bauxites do not possess uniform chemical and physical characteristics, their appearance and composition vary from geographical location to geographical location and even within the same geographical location, bauxites can differ in properties from local mining site to mining site. This large variation in properties seemed to pose insurmountable problems and discouraged those skilled in the art from using bauxite as a flame-retarding agent for the carpet industry. This was further emphasized by the fact that even the high purity alumina hydrate did not always perform satisfactorily in the polymer compositions utilized in the carpet industry. Thus, to alleviate some of the problems associated with the use of alumina hydrate in latex foams, U.S. Pat. No. 3,699,041—Sanderford et al recommends the use of surface modifiers to render the alumina hydrate compatible with latex compositions. In U.S. Pat. No. 3,874,889—Geppert et al, it is disclosed that alumina hydrate-filled latex foam collapse can be prevented by treating ground alumina hydrate with water at a selected temperature prior to use in the latex compositions.

It has now been discovered that regardless of the impure nature of bauxite and its nonuniform properties, bauxite can be successfully employed as a flame-retarding filler for polymer compositions such as utilized in the carpet industry. The bauxites, which can readily replace alumina hydrate as a flame-retarding filler in polymer compositions, are characterized by a surface area of less than about 12 $m^2/g$ when dried at about 100° C. for about one hour; a particle size distribution after grinding wherein not more than about 15% by weight of the particles have a size of less than about 3 microns and a pH in aqueous suspension which is in excess of about 6.5.

It has been found that these characteristics are inter-related and if any of these parameters are outside the limits shown, the bauxite will not perform satisfactorily in the polymer compositions. Unsatisfactory performance manifests itself in the accelerated thermal aging properties of polymer foams and/or unsuitably high viscosities in polymer precoat and adhesive compositions filled with bauxites which do not meet the above criteria. It has been further discovered that bauxites which possess a surface area between about 12 and about 20 $m^2/g$ can also be rendered suitable for incorporation as flame-retardant in polymer compositions utilized in the carpet industry when their surfaces are modified with an inorganic phosphate or silicate, or with an aliphatic or aromatic hydrocarboxylic acid, such as tannic acid or citric acid or salts of citric acid.

SUMMARY OF THE INVENTION

Flame-retarded polymer compositions are provided for the carpet industry for making foamed carpet backings, precoats and adhesives by incorporating as flame-retarding filler a ground bauxite characterized by a surface are of less than about 12 $m^2/g$ when dried at about 100° C. for 1 hour, a pH of at least about 6.5 in an aqueous suspension containing 5 g bauxite/100 g water, and a particle size distribution, wherein particles of less than about 3 microns in size constitute less than about 15% by weight of the bauxite. If the ground and dried bauxite has a surface area in the range of about 12-20 $m^2/g$ and/or a particle size distribution wherein about 15-20% by weight of the bauxite has a size of 3 microns or less, the bauxite can be rendered compatible with the polymer compositions by modifying it with about 0.1-5% by weight modifier selected from water-soluble inorganic phosphates, silicates, aliphatic and aromatic hydroxycarboxylic acids.

DETAILED DESCRIPTION OF THE INVENTION

This invention relates to the utilization of bauxites as flame-retarding filler for polymer compositions, such as employed in the carpet industry. More particularly, it concerns rendering bauxites suitable for incorporation as flame-retarding filler in polymer compositions, such as employed for making foamed carpet backings, precoats and adhesives.

For the purposes of the invention, the expression "polymer" compositions refers to natural and synthetic latex compounds and mixtures thereof, including carboxylated latex, which are commonly used in the carpet industry.

The term "bauxite" as used herein refers to the naturally occurring aluminous ore containing as major constituent alumina hydrate in an amount of at least about 40% by weight expressed as $Al_2O_3$, balance $Fe_2O_3$, $TiO_2$, $SiO_2$ and other impurities in varying amounts.

The expression "surface area" as employed herein refers to the surface area of bauxite, when dried at about 100° C. for one hour and measured by the well-known Brunauer-Emmett-Teller (BET) method as described in the J. Am. Chem. Soc. Vol. 60, p. 309 (1938).

To indicate the wide variety of bauxites encountered throughout the world, several bauxites are described in Table I. It is to be noted that for each bauxite shown, the average composition is given, since as mentioned hereinbefore, bauxites can vary even within one geographical location from mining site to site.

Table I

Average Composition of Bauxites from Varying Geographical Locations

| Composition & Properties | 1 | 2 | 3 | 4 | 5 | 6 | 7 |
|---|---|---|---|---|---|---|---|
| $Al_2O_3$ % by Wt. | 56 | 58 | 58.5 | 56 | 59 | 52.4 | 46.8 |
| $Fe_2O_3$ % by Wt. | 11.0 | 5.0 | 3.1 | 3.8 | 0.86 | 15.9 | 17.5 |
| $SiO_2$ % by Wt. | 3.1 | 0.8 | 4.6 | 2.8 | 5.12 | 5.58 | 1.0 |
| $TiO_2$ % by Wt. | 1.1 | 3.5 | 1.3 | 3.0 | 1.7 | 2.8 | 2.3 |
| CaO % by Wt. | <0.01 | <0.1 | <0.1 | <0.1 | <0.1 | <0.01 | 0.17 |
| Loss on Ignition* (LOI) % by Wt. | 29 | 30.5 | 30.6 | 29.1 | 30.8 | 24.0 | 28.0 |
| Surface Area $m^2/g$ | 6.4 | 9.0 | 10.0 | 10.0 | 16.0 | 29.0 | 39 |
| pH in Aqueous Suspension | 6.5 | 7.5 | 6.0 | 5.7 | 5.0 | 7.5 | 8.0 |

1 - South America
2 - West Africa
3 - South America
4 - South America
5 - South America
6 - Australia
7 - West Indies
*LOI - measured by calcination at 1000° C. for 1 hour As it can be observed from Table I, the average composition of bauxites greatly varies even within the same geographical area, e.g., on the continent of South America, bauxites having widely diverse properties are being mined.

The bauxites which have been found to be suitable for incorporation in polymer compositions are those which are characterized by a surface area of less than about 12 $m^2/g$ and a pH of more than about 6.5 in aqueous suspension at a bauxite concentration of 5 g/100 g water at 20° C. As one can observe from Table I, only a few of the bauxites meet the surface area and pH requirements which are only two of the three essential characteristics required for satisfactory performance in polymer compositions.

It is known that bauxites in native condition, that is, in "as mined" condition, range in particle size from mircon to pebble or even rock size. Consequently, to be able to incorporate bauxites as flame-retarding agent in polymer compositions, they must be ground to obtain a fairly uniform particle size distribution. Bauxites, when ground in conventional grinding equipment can be readily reduced in size; however, due to the nature of the ore, grinding unavoidably generates a large percentage of fines which are less than about 3 microns in size. For most, if not all, bauxites, this large percentage amounts to in excess of about 20%, more usually in the range of about 20-35% by weight of the total. Ground bauxites containing these high amounts of fines cannot be used for precoat and adhesive applications, due to the viscosity increase imparted to the polymers employed for this purpose. This has been the case even when the surface area and pH of the bauxites met the above referred to essential criteria. Consequently, it has been found that if the percentages of fines in the ground bauxite exceeds about 15% by weight, even if the surface area of the bauxite is below about 12 $m^2/g$ and its pH meets the required 6.5 minimum, the bauxite will not perform according to expectations. Thus, it is necessary to reduce the percentage of fines below the critical level to about 15% by weight or less. This can be accomplished by classification using conventional equipment.

Surprisingly, it has also been found that bauxites posssessing a surface area in the range of about 12-20 $m^2/g$, can be surface-modified or the undesirably high surface area "masked" by addition of a small but effective quantity of modifying agent. Additionally, it has also been discovered that if the bauxite contains up to about 20% by weight of fines and the surface area of the bauxite is 20 $m^2/g$ or less, modification with the agent also results in a bauxite flame-retarding filler which can be equally successfully utilized as those bauxites which meet all three essential criteria.

Suitable modifiers include inorganic phosphates, silicates and organic compounds selected from aliphatic and aromatic hydroxycarboxylic acids.

Inorganic phosphate modifiers utilized by this invention involve alkali metal and ammonium phosphates, as well as phosphoric acid. Typical examples of alkali metal phosphates are sodium and potassium phosphates, hydrogen phosphates and polyphosphates, such as $Na_3(PO_3)_6$. Suitable ammonium phosphates include ammonium mono, di and poly phosphates. In general, the inorganic phosphates which can be utilized for surface modification include all phosphates which are soluble in water at 20° C. in an amount of at least about 1.5 grams/100 grams of water.

The water-solubility requirement set forth above also applied to the alkali metal silicates found to be suitable for the "masking" or modification of bauxites which have a surface area of about 12-20 $m^2/g$ or a fine fraction percentage of about 15-20% by weight or both. Typical silicates include $Na_2O.3.3SiO_2$, otherwise known as "water-glass".

As far as the organic modifiers are concerned, it was discovered that suitable compounds include aliphatic and aromatic hydroxycarboxylic acids which exhibit a water-solubility similar to that required from the inorganic salts. Typical aliphatic hydroxycarboxylic acids which meet this requirement and perform in a satisfactory manner include citric acid and its alkali metal and ammonium salts and other chemically and structurally equivalent acids, such as tartaric acid.

Aromatic hydroxycarboxylic acids, which were found to satisfactorily modify bauxite surfaces include tannic acid and other chemically and structurally equivalent acids.

The quantity of modifier added to the bauxite is a small but an effective amount, and it is generally established by the degree of modification required.

It has been found that quantities in the range of about 0.5–5% by weight generally accomplish the desired modification; the range of about 0.2–4% by weight of bauxite was found to be satisfactory for most bauxites requiring modification.

Incorporation of the modifier in the bauxites can be accomplished before or during grinding. This type of modification allows substantially uniform distribution of the modifier on the surface of the bauxite particles. It is also possible to incorporate the modifier in the bauxite after grinding. In this instance, care is to be taken to obtain intimate contact between the bauxite particles and the modifier. Surprisingly, it has been found that addition of the modifier to the polymer compositions, rather than to the bauxite fails to accomplish the desired surface modification and the bauxite cannot be rendered compatible with the polymer compositions in this manner.

Application of the modifier is generally accomplished from an aqueous medium, for example, by spraying of the bauxite before grinding or introducing the modifier as a spray during grinding. In the alternative, the modifier can also be applied to the bauxite particles as they leave the grinding equipment. The modifier solution can be of any desired concentration. It has been found that concentrations up to about 5 moles/liter are the most suitable; higher than 5 moles/liter concentrations tend to cause local overdosages. Since many of the modifiers have only limited solubility in water, care is to be taken to avoid application of solutions which are supersaturated in modifier. Supersaturation may cause precipitation of the modifier under certain conditions which can result in nonuniform distribution of the modifier. Modifier concentrations below about 0.05 mole/liter may introduce too much water to the bauxite, which may require a subsequent drying step. Consequently, for best results, modifier concentrations between about 0.05 and 5 moles/liter are utilized, subject naturally to the solubility of the modifier in the aqueous medium at the temperature of application.

Utilization of bauxites having a surface area below about 12 $m^2/g$, a pH in excess of about 6.5 and a fine particle size ($<3\mu$) content of less than about 15% by weight, results in flame-retarded polymer foams which can be readily employed for carpet backing without danger of collapse or premature thermal aging. The bauxites meeting these three essential criteria also perform in a desired and satisfactory manner in precoats and adhesives without causing excessive viscosity increase which would otherwise render the polymer compositions unsuitable. If the bauxite has a surface area in the range of about 12–20 $m^2/g$, but the other parameters meet the critical limits, application of the modifiers can render the bauxites suitable for all of the above application. Further, modification of the bauxites with the instant modifiers also results in satisfactory performance, when both the surface area is in the range of about 12–20 $m^2/g$ and the fine content ($<3\mu$) is in the range of about 15–20% by weight.

The reasons for the beneficial effects attained by the use of the instant modifiers is not fully known. Without being bound to any particular theory, it is postulated that the undesirable thermal aging properties of foams and the increase of viscosity of precoat and adhesive compositions can be related to the combination of high surface area and iron content of the bauxite. Modification with the above referred to modifiers may result in a successful "masking" of these undesirable properties.

The following examples will further illustrate the novel aspects of the invention.

EXAMPLE I

This example is directed to the flame-retarding of latex foam compositions using varying unmodified and modified bauxites as flame-retarding agents. In all of the tests shown in this example, a latex composition was employed which consisted of 125 g latex, 12.9 g curing agent (mixture of ZnO and S), 7.5 potassium oleate and a small quantity of accelerator and sensitizer. In each latex test batch, 98 g flame-retarding filler was incorporated, then the mixture was frothed for 1.5 minutes, followed by addition of 5 ml ammonium acetate gelling agent. From the foamed test batches, slabs of 0.6 cm thickness were made and the slabs were cured for 20 minutes at 150° C. After curing, the quality of the foamed test slabs was determined and the results are shown in Table II. The foam slabs which passed the initial quality test were then subjected to a thermal aging test. This test was carried out at 135° C. for a time period of 96 hours. Every 24 hours during the thermal aging, test samples were taken from each batch and the quality of these samples was tested. Checking consisted of a bendability test, wherein the brittleness of the sample was determined. The quality of the test slabs was rated on a scale of 1 to 6 after each 24-hour aging period and then averaged for the entire 96-hour aging period. Any sample that had an average value beyond 3.1 was considered as unacceptable due to undesirable brittleness; values of 3.1 or less exhibited suitable pliability and were considered acceptable. The results of the thermal aging tests are equally shown in Table II.

The compositions and properties of the bauxites used in this example correspond to those described in Table I. Further, each modified bauxite contained about 0.3–0.5% by weight modifier, based on the weight of the bauxite.

Table II

Quality of Foamed and Thermally Aged Latex Foams Containing Various Unmodified and Modified Flame-Retarding Fillers

| Flame-Retardant Filler | Initial Foam Quality* | Thermal Aging in Hours | | | | | Average |
|---|---|---|---|---|---|---|---|
| | | 0 | 24 | 48 | 72 | 96 | |
| Alumina Hydrate | P | 1 | 1.2 | 1.8 | 2.7 | 3.8 | 2.1 |
| Bauxite 7 | F | — | — | — | — | — | — |
| Bauxite 5 | P | 1.5 | 2 | 3.5 | 5 | 6 | 3.6 |
| Bauxite 3 | P | 1.3 | 1.8 | 3.0 | 4.3 | 5.8 | 3.2 |
| Bauxite 1 | P | 1 | 1.6 | 2.6 | 4.6 | 5.6 | 3.1 |
| Bauxite 2 | P | 1 | 1.7 | 2.8 | 4.2 | 5.7 | 3.1 |
| Bauxite 2 | P | 1 | 1.7 | 2.6 | 4.1 | 5.2 | 2.9 |
| Bauxite 2 + $(NH_4)_2HPO_4$ | P | 1 | 1.2 | 2.2 | 3.3 | 5.3 | 2.6 |
| Bauxite + $NH_4H_2PO_4$ | P | 1 | 1.8 | 2.7 | 3.8 | 5.0 | 2.9 |
| Bauxite + $Na_2O.3.3SiO_2$ | P | 1.2 | 1.3 | 1.5 | 2.8 | 4.2 | 2.2 |
| Bauxite + Tannic Acid | P | 1 | 1.3 | 2.5 | 4.0 | 5.7 | 2.9 |

Table II-continued
Quality of Foamed and Thermally Aged Latex Foams Containing Various Unmodified and Modified Flame-Retarding Fillers

| Flame-Retardant Filler | Initial Foam Quality* | Thermal Aging in Hours | | | | | Average |
| --- | --- | --- | --- | --- | --- | --- | --- |
| | | 0 | 24 | 48 | 72 | 96 | |
| Bauxite + Na$_3$PO$_4$ | P | 1 | 1.3 | 2.0 | 3.7 | 4.8 | 2.6 |
| Bauxite + Na(PO$_3$)$_6$ | P | 1 | 1 | 1.7 | 3.2 | 4.5 | 2.3 |
| Bauxite + K$_2$HPO$_4$ | P | 1 | 1.3 | 2.8 | 4.2 | 4.8 | 2.8 |
| Bauxite + NH$_4$-citrate | P | 1 | 1.3 | 3.0 | 4.2 | 5.5 | 3.0 |

*P - Pass
F - Fail

From Table II it can be readily observed that bauxites failing to meet all three essential criteria, i.e., surface area, pH and fine particle size contact, do not satisfactorily undergo the thermal aging test. In contrast, those bauxites which either meet the requirements, or are modified, perform satisfactorily and provided aged foams which meet the standards of acceptability.

EXAMPLE II

In this example, the effect of bauxites as flame-retardant fillers are tested in precoat and adhesive compositions. These polymer compositions are generally aqueous suspensions of natural or synthetic latex or carboxylated latex and mixtures thereof. Sometimes, mixtures of latex and polyurethanes are utilized and more currently polyurethane compositions alone have been used for carpet adhesive and precoat application. Regardless of the type of polymers used in these applications, the problems of viscosity increase arise when bauxites, not meeting the surface are, pH and fines content criteria, are utilized. In the instant example, mixtures of natural latex and butadiene, such as used in example I, are employed in aqueous dispersion for making a flame-retarded precoat composition. Viscosity stability testing of the latex compositions, each of which contains 200 grams of bauxite/100 grams of latex, is accomplished by the conventional Brookfield LVT, #4 spindle method at 30 rpm. The viscosity of the flame-retarded precoat composition is first determined upon admixture of the filler with the polymer composition, then the admixture is agitated for 1 hour at about 1000 rpm and the viscosity of the admixture redetermined. Any admixture, which after 1 hour has a viscosity in excess of about 20,000 cps cannot be employed either for precoat or for adhesive applications. The results of the viscosity tests are shown in Table III.

Table III
Viscosity Measurements of Flame-Retarded Polymeric Precoat Compositions

| Flame-Retardant Filler | Viscosity in Centipoise (cps) | |
| --- | --- | --- |
| | Initial | 1 Hour |
| None | | |
| Alumina Hydrate | 7,500 | 6,100 |
| Bauxite 3 | Solid | Solid |
| Bauxite 4 | 87,500 | >200,000 |
| Bauxite 5 | Solid | Solid |
| Bauxite 6 | Solid | Solid |
| Bauxite 7 | Solid | Solid |
| Bauxite 2 | 15,000 | 18,000 |
| Bauxite 2 + Na$_2$O.3.3SiO$_2$ | 7,500 | 8,100 |
| Bauxite 2 + Tannic Acid | 9,700 | 10,000 |
| Bauxite 2 + (NH$_4$)$_2$HPO$_4$ | 8,000 | 7,900 |
| Bauxite 4 + (NH$_4$)$_2$HPO$_4$ | 40,000 | 18,500 |

It can be observed that the viscosity increase of those bauxite-filled admixtures where the bauxite meets the three essential criteria perform satisfactorily. It can also be seen that addition of the modifiers significantly improves the viscosities of precoat and adhesive compositions, thus providing increased shelf-life for these polymer compositions.

It is to be understood that while the instant invention is described in great detail, various modifications, alterations and changes may be made thereto without departing from the spirit and scope thereof as defined in the appended claims.

What is claimed is:

1. Flame retarded conventional natural or synthetic rubber latex compositions employed in the carpet industry for making foamed carpet backings, precoats and adhesives containing as flame-retarding filler a ground naturally occurring bauxite which is rendered compatible with the latex compositions and is characterized by an Al$_2$O$_3$ content from at least about 40% by weight to about 60% by weight, wherein the Al$_2$O$_3$ is in the hydrated form, balance Fe$_2$O$_3$, TiO$_2$, SiO$_2$ and other impurities, the ground bauxite being further characterized by a surface area of less than about 12 m$^2$/g when dried for 1 hour at about 100° C., a pH of at least about 6.5 when measured at 20° C. in an aqueous suspension containing 5 grams of ground bauxite/100 grams of water, a particle size distribution, wherein particles of less than about 3 microns in size constitute less than about 15% by weight of the ground bauxite and the amount of ground bauxite incorporated in the latex composition is sufficient to impart flame retardancy.

2. A process of rendering for flame-retarding purposes a ground, naturally occurring bauxite compatible with conventional natural or synthetic rubbber latex compositions employed in the carpet industry for making foamed carpet backings, precoats and adhesives which comprises modifying the bauxite, which is characterized by an Al$_2$O$_3$ content from at least about 40% by weight to about 60% by weight, wherein the Al$_2$O$_3$ is in the hydrated form, balance Fe$_2$O$_3$, TiO$_2$, SiO$_2$ and other impurities, a surface area of less than about 20 m$^2$/g when dried for 1 hour at about 100° C., a pH of at leat about 6.5 when measured at 20° C. in an aqueous suspension containing 5 grams of ground bauxite/100 g of water, a particle size distribution wherein particles of less than about 3 micron in size constitute less than about 20% by weight of the ground bauxite, prior to the incorporation of the bauxite in the latex compositions with about 0.05-5.0 by weight modifier, the modifier being selected from the group consisting essentially of water-soluble inorganic phosphates and silicates, aliphatic and aromatic hydroxycarboxylic acids and incorporating the modified bauxite in the latex compositions in an amount sufficient to impart flame-retardancy to the latex compositions.

3. Process according to claim 2, wherein the modifier is H$_3$PO$_4$, an alkali metal or ammonium phosphate.

4. Process according to claim 2, wherein the modifier is an alkali metal silicate.

5. Process according to claim 2, wherein the modifier is tannic acid.

6. Process according to claim 2, wherein the modifier is citric acid or its alkali metal or ammonium salt.

7. Process according to claim 2, wherein the modifier is added to the bauxite in an aqueous solution.

8. Flame retarded conventional natural or synthetic rubber latex compositions employed in the carpet industry for making foamed carpet backings, precoats and adhesives containing as flame-retarding filler a modified ground, naturally occurring bauxite characterized by an $Al_2O_3$ content from at least about 40% by weight to about 60% by weight, wherein the $Al_2O_3$ is in the hydrated form, balance $Fe_2O_3$, $TiO_2$, $SiO_2$ and other impurities, the ground bauxite being further characterized by a surface area of less than about 20 $m^2/g$ when dried for 1 hour at about 100° C., a pH of at least about 6.5 when measured at 20° C. in an aqueous dispersion containing 5 grams of ground bauxite/100 grams of water, particle size distribution, wherein particles of less than about 3 microns in size constitute less than about 20% by weight of the ground bauxite; and wherein the modified bauxite contains about 0.5–5% by weight modifier selected from the group consisting essentially of water-soluble inorganic phosphates and silicates, aliphatic and aromatic hydroxycarboxylic acids and the amount of modified ground bauxite incorporated in the latex compositions is sufficient to impart flame retardancy.

9. In the process of flame-retarding conventional natural or synthetic rubber latex compositions employed in the carpet industry for making foamed carpet backings, precoats and adhesives by incorporating high purity alumina hydrate as flame-retarding filler, the improvement which comprises substituting the alumina hydrate with a naturally occurring bauxite containing from at leat about 40% by weight to about 60% by weight $Al_2O_3$, wherein the $Al_2O_3$ is in the hydrated form, balance $Fe_2O_3$, $TiO_2$, $SiO_2$ and other impurities, the bauxite being rendered compatible with the latex compositions prior to incorporation by grinding it to a size wherein particles of less than about 3 microns in size constitutes less than about 15% by weight of the ground bauxite and by further enhancing its compatibility with the latex compositions through limiting the surface area of the ground bauxite to less than about 12 $m^2/g$ when measured after drying at about 100° C. for 1 hour and its pH to at least about 6.5 when measured at 20° C. in an aqueous suspension containing 5 grams of ground bauxite/100 grams of water, the quantity of compatible ground bauxite incorporated in the latex compositons being sufficient to establish flame retardancy.

* * * * *

UNITED STATES PATENT AND TRADEMARK OFFICE
CERTIFICATE OF CORRECTION

PATENT NO. : 4,216,130
DATED : August 5, 1980
INVENTOR(S) : Ronald J. Rigge, Burton J. Beadle, William A. Belding It is certified that error appears in the above-identified patent and that said Letters Patent are hereby corrected as shown below:

Column 4, line 47, "applied" should be --applies--
Column 5, line 2, "0.5-5%" should be --0.05-5%--
Column 6, line 25, "7.5" should be --7.5g--
Column 7, line 17, "provided" should be --provide--
Column 7, line 31, "are" should be --area--
Column 8, line 54, "leat" should be --least--
Column 9, line 25, "0.5-5%" should be --0.05-5%--
Column 10, line 11, "leat" should be --least--
Column 10, line 17, "constitutes" should be --constitute--

Signed and Sealed this

Third Day of February 1981

[SEAL]

Attest:

RENE D. TEGTMEYER

Attesting Officer     Acting Commissioner of Patents and Trademarks